April 3, 1951          H. M. WAGNER          2,547,066
BEACON GUIDE
Filed Oct. 16, 1945

*INVENTOR.*
HERBERT M. WAGNER

BY William D. Hall
Attorney

Patented Apr. 3, 1951

2,547,066

UNITED STATES PATENT OFFICE 2,547,066

BEACON GUIDE

Herbert M. Wagner, Asbury Park, N. J.

Application October 16, 1945, Serial No. 622,645

14 Claims. (Cl. 343—106)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to directional radio systems, and particularly to a system of the type which is suitable for use as a radio beacon.

Radio beacons generally in use operate on the principle of transmitting a signal from a directional antenna, whereby the signal received varies in amplitude as a function of the direction. While such a system can be used with an amplitude modulation receiver, it is not suitable for use with a frequency modulation or phase modulation receiver because the amplitude limiter incorporated in such receivers tends to maintain the received signal constant over a wide range of signal strengths.

It is a principal object of this invention to provide a radio beacon in which the degree of frequency or phase modulation of the signal received therefrom is a function of the direction of reception whereby it is suitable for use with a wavelength modulation receiver, i. e., frequency modulation or phase modulation receiver.

In accordance with this invention, a signal is transmitted through an antenna, the effective position in space of which is continuously shifted. The resulting signal received at a given point in space will therefore vary in phase depending upon the relative velocity of the point of transmission with respect to the point of reception. Because the relative velocity is a function of the bearing of the point of reception with respect to the direction of antenna displacement, the received signal becomes phase or frequency modulated to a degree dependent upon said bearing.

For a better understanding of the invention, together with other and further objects thereof, reference is had to the following description taken in connection with the accompanying drawing, wherein like parts are indicated by like reference numerals and wherein.

Figure 1:
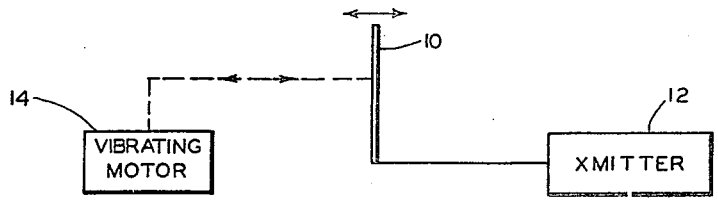
Figure 1 is a block diagram of one embodiment of the invention.
Figure 2:
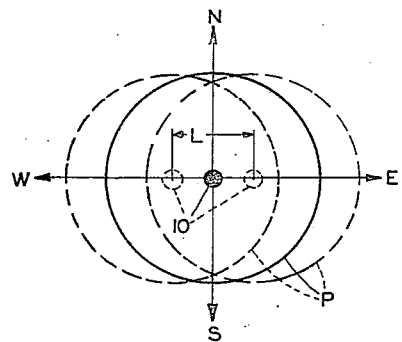
Figure 2 is a theoretical diagram illustrating the operation of the invention.

Referring now particularly to Figs. 1 and 2, there is shown a vertical rod antenna 10 having a circular radiation pattern and fed by a fixed frequency radio transmitter 12. A motor 14 is mechanically connected to antenna 10 to move it back and forth in a plane for a distance.

It will be seen from Fig. 2 that, under such conditions, the antenna, and hence the point of radiation, will have a maximum component of radial velocity with respect to any point along line E—W. A frequency or phase modulation receiver 16 along this line will therefore receive the loudest signal. On the other hand, the degree of phase modulation of the signal along line N—S will be zero or minimum, and, hence, zero or minimum signal will be observed in a receiver along the line N—S.

Figure 3:
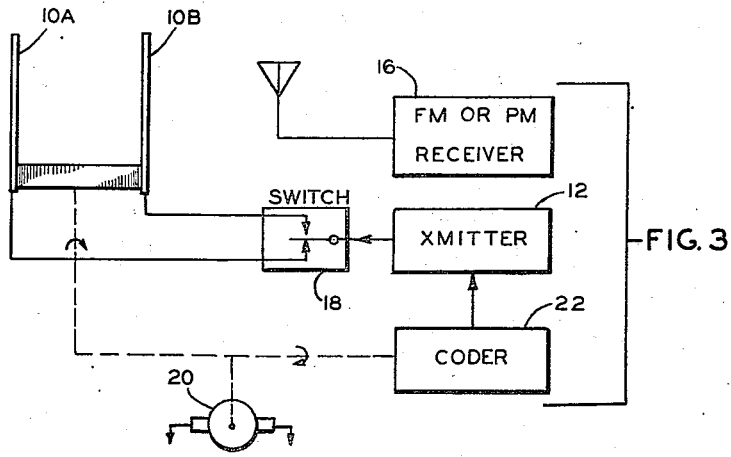
Figure 3 is a block diagram of another embodiment of the invention.

The beacon can be made omnidirectional by rotating the plane of oscillation of antenna 10 in azimuth and code-modulating the signal as a function of the instantaneous azimuth in a manner to be described in greater detail in connection with Fig. 3. The effective direction of maximum and minimum signals is thus continuously varied so that an observer can, by means of the code signal accompanying the minimum or maximum signal, determine his bearing with respect to the beacon. In practice, it is not feasible to physically oscillate the antenna, except where relatively short wavelengths are involved. The embodiment in Fig. 3 avoids this difficulty by making use of two identical, vertical rod antennas 10A and 10B positioned in the same plane and spaced at a distance which is preferably less than the operating wavelength of the transmitter. The output of transmitter 12 is alternately applied to said antennas by means of a rapidly operating, motor driven or electronic switch 18. In this manner, the effective position of the point of radiation is rapidly oscillated, whereby the degree of phase modulation will vary with the direction of propagation in a manner similar to that described in connection with Fig. 1.

For use as an omnidirectional beacon, the plane of the antennas is rotated in azimuth by means of a motor 20 whereby the plane of effective motion of the point of radiation is continuously varied. Driven in synchronism with the rotation of the antennas is a coder 22 which imparts a characteristic code-letter modulation to the oscillations generated by transmitter 12 for each azimuthal position of the plane of the antennas. Thus, an observer at a given point will listen for the code letter heard when the signal is either maximum or minimum and thus be apprised of his bearing with respect to the beacon.

From the above description it will be seen that the invention involves a radio beacon which transmits a signal which, at a particular point in space, is characterized by a phase or frequency modulation, the degree of said modulation being dependent upon the bearing of the point of reception with respect to the point of transmission.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. In combination with a phase-modulation receiver, a beacon transmitter system comprising means for generating a fixed-frequency wave, and non-directional means for alternately radiating said wave without change in phase from only one of a plurality of physically-displaced points to provide a phase-modulated wave in said receiver.

2. In combination with a wave-length modulation receiver, a beacon transmitter system comprising means for generating a fixed-frequency radio wave, means for omnidirectionally radiating said wave alternately without change in phase from a plurality of physically-displaced points, to provide a wave-length modulated wave in said receiver, the degree of modulation of the received wave being dependent upon the bearing of the point of reception relative to the mean point of transmission, and means in said receiver to detect said degree of modulation.

3. In combination with an omnidirectional wave-length modulation receiver, a beacon transmitter system comprising means for generating a fixed-frequency radio wave, a plurality of omnidirectional, physically-spaced radiators, means to alternately impress said wave with substantially no change in phase upon said radiators whereby the effective point of transmission of said wave is modulated to provide a wave-length modulated wave in said receiver, the degree of modulation of the received wave being dependent upon the bearing of the point of reception relative to the mean point of transmission, and means in said receiver to determine said degree of modulation.

4. In combination with an omnidirectional phase-modulation radio receiver, a beacon transmitter system comprising means for generating a fixed-frequency radio wave, a pair of omnidirectional, physically-spaced antennas lying in the same plane, means to alternately impress said wave with substantially no change in phase upon said antennas, whereby the effective point of transmission of said wave is modulated to provide a phase-modulated wave in said receiver, the degree of modulation of the received wave being dependent upon the bearing of the point of reception relative to the mean point of transmission, and means in said receiver to determine said degree of modulation.

5. The combination as set forth in claim 4, wherein said receiver has an amplitude limiter therein.

6. The method of directional signaling which comprises radiating a fixed-frequency wave from a single point in space and periodically displacing the position of said point of radiation with substantially no change in the phase of said wave, and detecting the wave-length modulation component of said wave at a second point to determine the bearing of said second point relative to the first point.

7. The method of directional signaling which comprises radiating a fixed-frequency wave from a single point in space and rapidly oscillating the position of said point of radiation in a plane with substantially no change in the phase of said wave, and determining the bearing of a second point relative to that of the first point by detecting the wave-length modulation component of said wave at said second point.

8. The method of directional signaling which comprises radiating a fixed-frequency wave from a single point in space, rapidly oscillating the position of said point of radiation in a plane with substantially no change in the phase of said wave, continuously rotating said plane, and applying a modulation signal to said wave to characterize the instantaneous orientation of said plane.

9. The method of establishing a radio beacon for use with a wavelength modulation receiver which comprises non-directionally radiating a fixed-frequency wave from a single point in space and periodically displacing the point of radiation symmetrically with respect to a second point with substantially no change in the phase of said wave.

10. The method of establishing a radio beacon for use with a wavelength modulation receiver which comprises non-directionally radiating a fixed-frequency radio wave from a single point in space, and oscillating the point of radiation in a plane with substantially no change in the phase of said wave.

11. The method of establishing a radio beacon for use with a phase modulation receiver which comprises non-directionally radiating a fixed-frequency radio wave from a single point in space, oscillating the point of radiation in a plane with substantially no change in the phase of said wave, and continuously rotating said plane during oscillation of said point.

12. A radio beacon comprising means to generate a fixed-frequency wave, a pair of substantially non-directional, coplanar antennas, means to alternately radiate said wave from said antennas without change in phase, means to continuously rotate the plane of said antennas, and means to modulate said wave at at least one position of said plane with a signal indicative of said position.

13. The combination set forth in claim 4, including means to continuously rotate the plane of said antennas, and means to impart to said wave at at least one position of said plane a signal indicative of said position.

14. The combination set forth in claim 4, including means to continuously rotate the plane of said antennas, and means to impart to said wave a distinctive signal indicative of the instantaneous orientation of said plane.

HERBERT M. WAGNER.

REFERENCES CITED

The following references are of record in the file of this patent:

UNITED STATES PATENTS

| Number | Name | Date |
| --- | --- | --- |
| 2,225,456 | Koschmieder | Dec. 17, 1940 |
| 2,350,747 | Gamet | June 6, 1944 |
| 2,411,518 | Busignies | Nov. 26, 1946 |
| 2,412,631 | Rice | Dec. 17, 1946 |
| 2,413,694 | Dingley | Jan. 7, 1947 |
| 2,414,798 | Budenbom | Jan. 28, 1947 |

FOREIGN PATENTS

| Number | Country | Date |
| --- | --- | --- |
| 571,238 | Germany | Feb. 25, 1933 |